Feb. 11, 1941.　　　R. C. GRIFFITH ET AL　　　2,231,331
POWER TRANSMISSION
Filed Dec. 31, 1938　　　2 Sheets-Sheet 1

INVENTORS
RAYMOND C. GRIFFITH &
DUNCAN B. GARDINER
BY
ATTORNEY

Feb. 11, 1941.   R. C. GRIFFITH ET AL   2,231,331
POWER TRANSMISSION
Filed Dec. 31, 1938   2 Sheets-Sheet 2
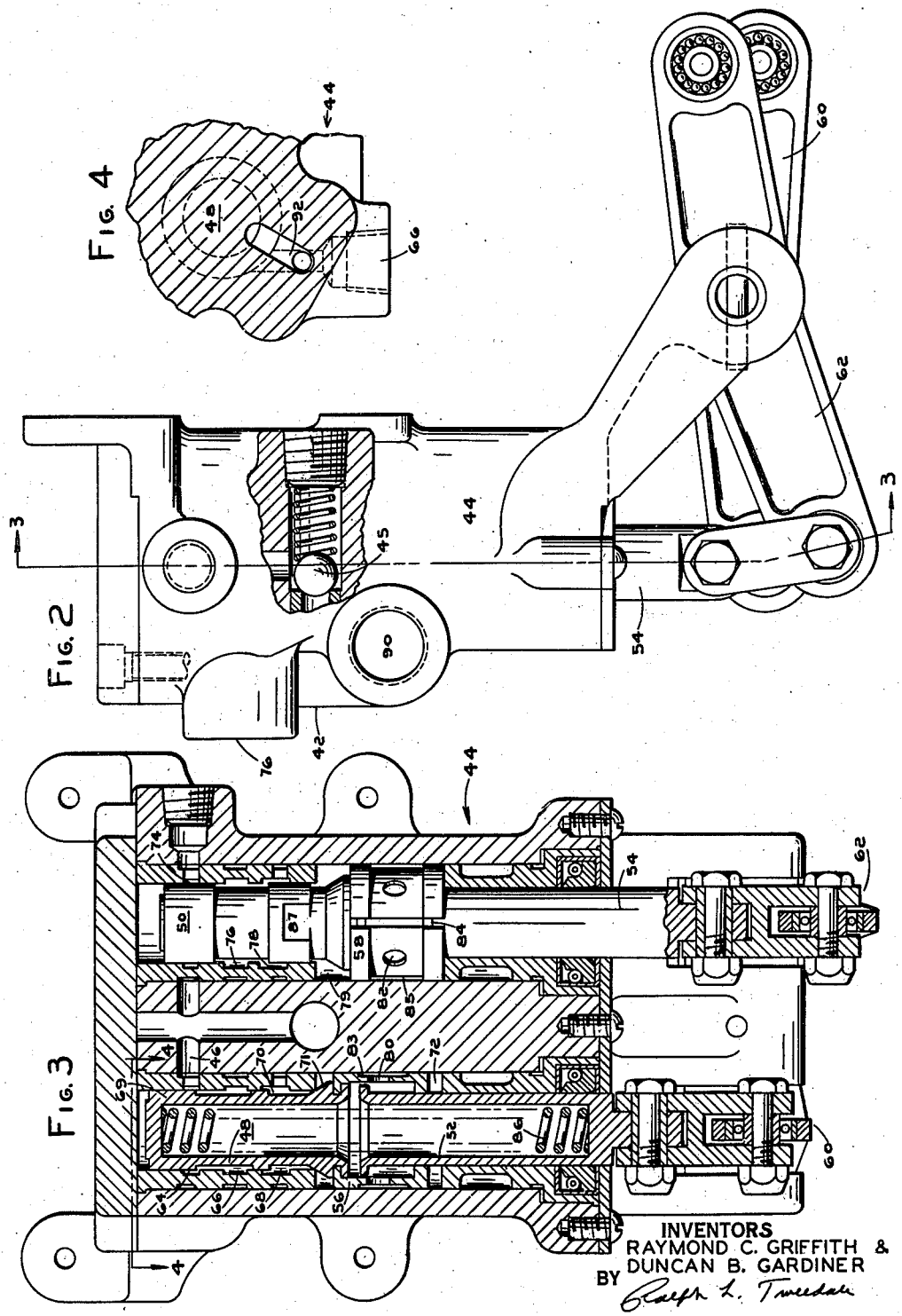
INVENTORS
RAYMOND C. GRIFFITH &
DUNCAN B. GARDINER
BY
ATTORNEY Patented Feb. 11, 1941

2,231,331

UNITED STATES PATENT OFFICE 2,231,331

POWER TRANSMISSION

Raymond C. Griffith and Duncan B. Gardiner, Detroit, Mich., assignors to Vickers Incorporated, Detroit, Mich., a corporation of Michigan Application December 31, 1938, Serial No. 248,842

6 Claims. (Cl. 303—54)

This invention relates to power transmissions, particularly to those of the type comprising two or more fluid pressure energy translating devices one of which may function as a pump and another as a fluid motor.

The invention is more particularly concerned with power transmission systems adapted for use in applying selectively variable force to a load device such as a vehicle or aircraft brake.

In operation of such a load it is desirable that the force applied to the load be under operator control in such a manner that the manual effort applied to the controlling element determines the force applied to the load as distinguished from a condition where the distance through which the controlling element is moved determines such force. In other words, it is desirable that the control have the same "feel" as occurs in a system where the manual effort is transmitted directly to the load without amplification from an outside source.

Systems heretofore proposed for providing such control have been limited both in the range over which the force applied to the load may be varied and also in sensitivity to small changes in force applied to the control element.

It is an object of the present invention therefore to provide an improved power transmission system for applying selectively variable force to a load device and which provides a wide range of variation of force applied and with a far greater sensitivity of adjustment than has been heretofore achieved.

Further objects and advantages of the present invention will be apparent from the following description, reference being had to the accompanying drawings wherein a preferred form of the present invention is clearly shown.

In the drawings:

Figure 2 is a view of the brake control valve partly in section.

Figure 3 is a section taken on line 3—3 of Figure 2.

Figure 4 is a fragmentary section taken on line 4—4 of Figure 3.

Figure 1:
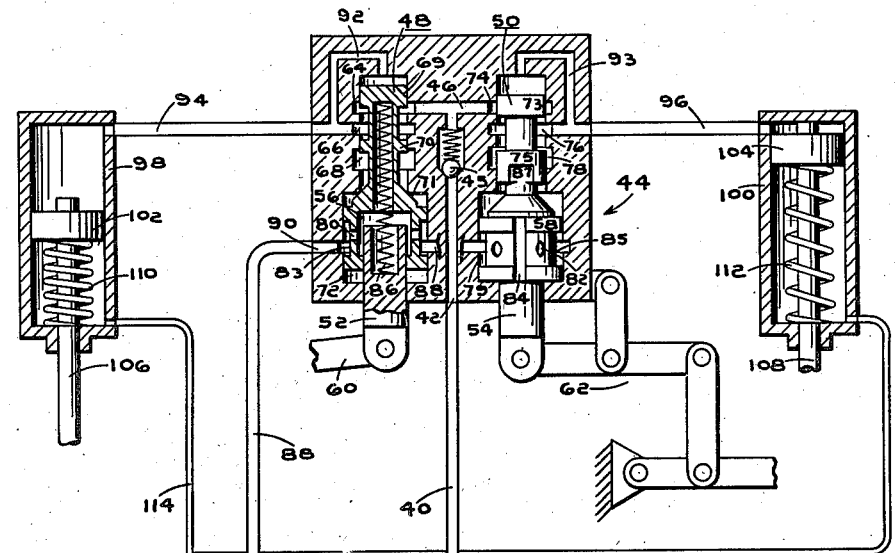
Figure 1 is a diagrammatic view of a brake control circuit incorporating a preferred form of the present invention.
Figure 1:
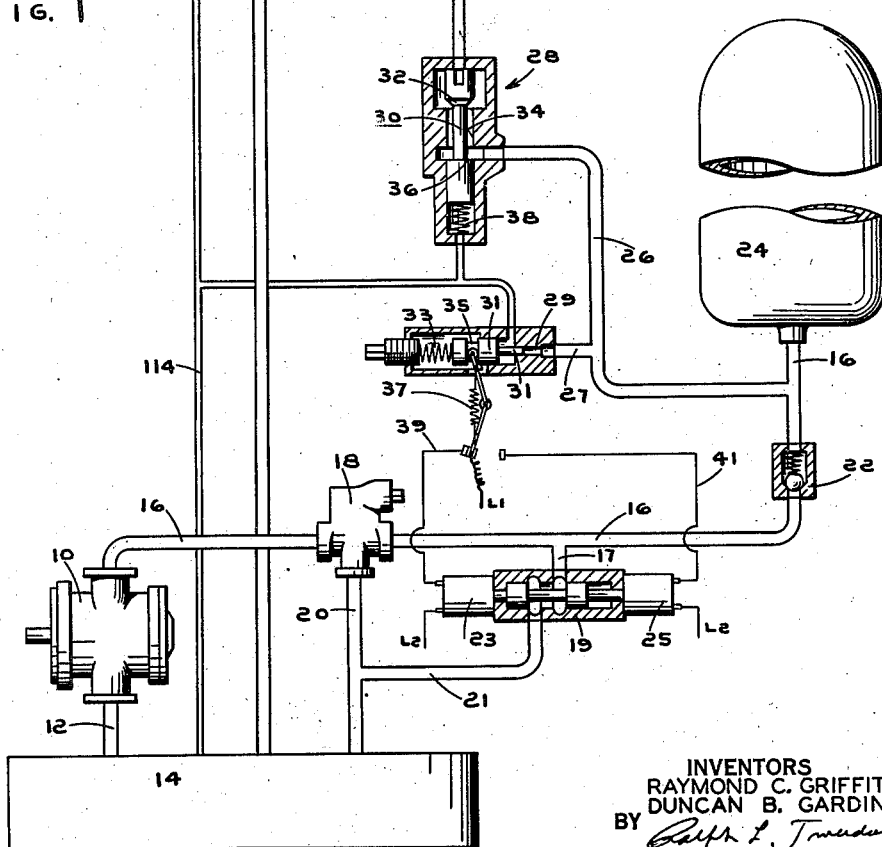

Referring now to Figure 1, a pump 10 that may be driven by any suitable means such as an electric motor, not shown, has a suction conduit 12 through which fluid may be withdrawn from a tank 14 and delivered to a delivery conduit 16. Placed in conduit 16 is a relief valve 18 of conventional construction that is adapted to bypass fluid to tank through a conduit 20 whenever a predetermined safe pressure is exceeded in the conduit 16.

A branch conduit 17 connects to a solenoid-operated unloading valve 19 from which a conduit 21 leads to tank. The solenoid 23 when energized is adapted to shift valve 19 to the left and thus open the valve to bypass the pump delivery to tank. When the solenoid 25 is energized the valve is shifted to the right to block the bypass.

The conduit 16 extends to a check valve 22 and from there to an accumulator 24. A conduit 26 branches off from conduit 16 at a point between the check valve 22 and accumulator 24 and extends to a pressure-reducing valve 28. The latter has a spool 30 with a beveled seat 32 adapted to control the flow through passage 34. The enlarged portion 36 has the same area as the seat at 32 so that the pressure existing on the top end of the spool is the only pressure effective to move the spool. A spring 38 tends to hold the spool 30 in its upper position and is balanced by the pressure on top of the spool to maintain this pressure constant.

Communicating with conduit 26 by a branch 27 is a pressure responsive snap-acting switch for controlling the solenoids of valve 19. This switch may comprise a cylinder 29 containing a small piston 31 which is urged to the right by an adjustable spring 33. The piston 31 has a groove 35 in which rides the operating lever of an over-center switch 37 adapted to selectively connect a line L¹ with either a conductor 39 leading to solenoid 23 or a conductor 41 leading to solenoid 25. Thus when pressure in line 26 exceeds the setting of spring 33, the piston 31 will be forced to the left, as shown, shifting switch 37 and energizing solenoid 23 to unload pump 10. When the pressure in line 26 falls a predetermined amount, the piston 31 shifts to the right energizing solenoid 25 and again loading pump 10.

A conduit 40 extends from the valve 28 to port 42 of a brake-control valve 44. A check valve 45 permits free flow from the port 42 to a conduit 46. The valve 44 has therein two identical valve spools 48 and 50 having operating sleeves 52 and 54 respectively. Sleeves 52 and 54 are slidably mounted in enlarged hollow sections 56 and 58 respectively of spools 48 and 50. The sections 56 and 58 are formed as split halves separated by a slot 84. Suitable linkages 60 and 62 may be so arranged that by depressing separate foot pedals, not shown, the corresponding sleeves will rise.

The valve spool 48 controls a pressure port 64, a cylinder port 66 and a tank port 68 with two lands 69 and 70. The enlarged section 56 of spool 48 has a bevel 71 that is adapted to seat against the valve block 44, sealing the port 68 from chamber 72 in which the section 56 is slidable.

The valve spool 50 controls a pressure port 74, a cylinder port 76 and a tank port 78 with two lands 73 and 75. Its enlarged section 58 is mounted in a chamber 79. The sections 56 and 58 have holes 80 and 82 respectively connecting their interior space with grooves 83 and 85 on the outside thereof. The lands 70 and 75 are formed with a pair of milled flats 87 in each, which maintain the ports 68 and 78 in communication with the space below the lands 70 and 75 at all times. A spring 86 is placed between valve spool 48 and the operating sleeve 52. A tank conduit 88 connects the chambers 72 and 79 and extends through a port 90 of valve 44 to the tank 14.

The two pressure ports 64 and 74 connect to the conduit 46. A conduit 92 connects the cylinder port 66 to the upper end of the bore of valve spool 48, a corresponding conduit 93 being provided at valve 50. The two cylinder ports 66 and 76 are connected by conduits 94 and 96 respectively to the head ends of two cylinders 98 and 100 in which are slidably mounted pistons 102 and 104 mounted on rods 106 and 108. Pistons 102 and 104 are normally held in their uppermost positions by springs 110 and 112 respectively. The rod ends of cylinders 98 and 100 are connected to a drain conduit 114 that extends to tank. The valve 38 is also drained by conduit 114.

In operation, with the pump 10 operating and pistons 102 and 104 in their uppermost positions and valve spools 48 and 50 in their lowermost positions, fluid is drawn from the tank 14 through conduit 12 and delivered by conduit 16 and check valve 22 to the accumulator 24. As ports 64 and 74 are blocked by spools 48 and 50 fluid cannot pass therethrough. Pressure fluid, therefore, continues to be delivered to the accumulator 24 until it is loaded. The switch 37 then shifts to unload the pump. Check valve 22 prevents backflow to the pump. Pressure fluid from the accumulator will pass through conduits 16 and 26, bore 34 of valve 28, conduit 40, port 42 of valve 44 and check valve 45 to the conduit 46.

If the operator should now depress a pedal suitably connected to linkage 60, the operating sleeve 52 will rise, compressing the spring 86. Spring 86 will urge valve spool 48 upwardly until the bevel 71 seats, as shown in the drawings. In this position the land 69 of spool 48 opens the pressure port 64 to the cylinder port 66, thereby delivering pressure fluid from the accumulator through conduit 94 to the head end of cylinder 98. Accordingly the piston 102 moves downwardly against the bias of spring 110 causing the rod 106 to actuate the brake or other mechanism. Any fluid that may be in the rod end of cylinder 98 will pass to tank through conduit 114.

Pressure existing in cylinder 98 and conduit 94 is transmitted by conduit 92 to the upper end of the bore of spool 48. Spool 48 will remain seated until the pressure in cylinder 98 rises high enough to overcome the resistance of spring 86. When this point is reached spool 48 will move downwardly causing its land 69 to restrict the port 64 until the pressure in cylinder 98 drops sufficiently to come into equilibrium with the pressure exerted by spring 86. When this occurs the spool 48 and piston 102 are balanced and remain stationary as long as the sleeve 52 is held in its position. Any fluid that may be inside section 56 passes out holes 80 to port 90 and by conduit 88 to tank.

If it is desired to secure a higher pressure in cylinder 98 to further lower rod 106, the operating sleeve 52 may be raised still more to compress spring 86 to a greater degree. Thus, because of this greater compression of spring 86, valve spool 48 will again rise. Pressure then will be transmitted to the cylinder 98 and will lower piston 102 from the point at which it had previously come to rest. When the pressure in cylinder 98 rises above the increased resistance offered by spring 86 it will again lower spool 48 to restrict the pressure port 64 until the pressure in cylinder 98 again comes into equilibrium with the resistance offered by the spring 86. When this occurs the piston 102 will be in a lower position than where it had previously stopped.

If the sleeve 52 be now permitted to descend a small amount, the pressure in cylinder 98 will exceed the pressure exerted by the spring 86 and the spool 48 will be forced down such a distance that its land 69 will block the pressure port 64 and open the cylinder port 66 to the tank port 68. The pressure in cylinder 98 will then be relieved until it again balances with the new setting of the spring 86. The spool 48 is so designed that after the land 69 blocks port 64 only a very slight downward movement of spool 48 is necessary to open the port 66 to the tank port 68.

In order to allow piston 102 to rise and retract the rod 106, the operating sleeve 52 is released which allows it to lower. This permits spool 48 to fall to its lowermost position corresponding to that of spool 50 as shown in the drawings. In this position cylinder 98 is open to tank through conduit 94, ports 66 and 68, flat 87, slot 84, chamber 72, holes 80, port 90 and conduit 88.

The valve spool 50 serves to actuate the piston 104 and its rod 108 of cylinder 100, the same as spool 48 controls piston 102. A pedal acting through linkage 62 actuates sleeve 54 to control valve spool 50. Fluid is delivered to cylinder 100 from conduit 46 through ports 74 and 76 and conduit 96. Fluid returning from piston 100 passes to tank through ports 76 and 78, flat 87, slot 84, chamber 79, holes 82, conduit 88, chamber 72, port 90 and conduit 88.

The purpose of the pressure reducing valve 28 is to maintain an even pressure in conduit 40. If the pressure in conduit 26 is exceedingly high, its action on the top end of spool 30 causes it to move downwardly against the bias of spring 38 causing bevel 32 to throttle the pressure fluid passing through bore 34. If the pressure should decrease in conduit 26, spring 38 will move spool 30 upwardly to open bore 34.

It will be noted that the sleeves 52 and 54 are provided with a flanged upper end which is arranged to positively move the spool upwardly when the sleeve is moved up to its limit of travel. This provides for positive raising of the spool if due to dirt or other causes the spool should stick. The flange also positively engages the spool at the limit of downward travel to correspondingly insure that the spool may be pulled down if it should stick in its upper position.

The beveled portion 71 provides a means for positively blocking the cylinder line against leakage to tank when the spool 48 is fully raised. This insures that the full capacity of the pump and accumulator is available for operating the brake cylinders. In practice the lift of the spools from centered to fully up position is made very small, on the order of .005", while the range of movement of the spring operating sleeves is preferably on the order of one-half inch or one hundred times the lift of the spools. In this way the valve has a wide range of pressure available at the brake piston and is still sensitive enough to respond to rather small adjustments in the pressure.

While the form of embodiment of the invention, as herein disclosed, constitutes a preferred form, it is to be understood that other forms might be adopted, all coming within the scope of the claims which follow.

What is claimed is as follows:

1. In a hydraulic power transmission system for applying selectively variable force to a load device such as a brake and including means forming a source of fluid under pressure, a fluid motor for operating the load device in one direction, and biasing means for operating the load device in the opposite direction, the combination of a three-way valve having a single shiftable spool for selectively connecting the motor either to said source or to exhaust, a spring for shifting said valve to open the same to the source, pressure responsive means hydraulically connected to said motor for shifting the valve to open the same to exhaust, manually shiftable means to vary the force exerted by the spring, and additional valve means connected to move with the shiftable spool for sealing the motor from exhaust only when the valve is fully opened to said source.

2. In a hydraulic power transmission system for applying selectively variable force to a load device such as a brake and including means forming a source of fluid under pressure, a fluid motor for operating the load device in one direction, and biasing means for operating the load device in the opposite direction, the combination of a three-way valve having a single shiftable spool for selectively connecting the motor either to said source or to exhaust, a spring for shifting said valve to open the same to the source, pressure responsive means hydraulically connected to said motor for shifting the valve to open the same to exhaust, and manually shiftable means to vary the force exerted by the spring, said valve having a maximum stroke less than five per cent of the stroke of the manually shiftable means, measured at the spring.

3. In a hydraulic power transmission system for applying selectively variable force to a load device such as a brake and including means forming a source of fluid under pressure, and a fluid motor for operating the load device in one direction, the combination of a three-way valve having a single shiftable spool for selectively connecting the motor either to said source or to exhaust, a spring for shifting said valve to open the same to the source, pressure responsive means hydraulically connected to said motor for shifting the valve to open the same to exhaust, manually shiftable means to vary the force exerted by the spring, and additional valve means connected to move with the shiftable spool for sealing the motor from exhaust only when the valve is fully opened to said source.

4. In a hydraulic power transmission system for applying selectively variable force to a load device such as a brake and including means forming a source of fluid under pressure, and a fluid motor for operating the load device in one direction, the combination of a three-way valve having a single shiftable spool for selectively connecting the motor either to said source or to exhaust, a spring for shifting said valve to open the same to the source, pressure responsive means hydraulically connected to said motor for shifting the valve to open the same to exhaust, and manually shiftable means to vary the force exerted by the spring, said valve having a maximum stroke less than five per cent of the stroke of the manually shiftable means, measured at the spring.

5. In a hydraulic power transmission system for applying selectively variable force to a load device such as a brake and including means forming a source of fluid under pressure, and a fluid motor for operating the load device in one direction, the combination of a spool-type three-way valve having a single shiftable spool for selectively connecting the motor either to said source or to exhaust, a spring for shifting said valve to open the same to the source, pressure responsive means hydraulically connected to said motor for shifting the valve to open the same to exhaust, manually shiftable means to vary the force exerted by the spring, and additional poppet valve means connected to move with the shiftable spool for sealing the motor from exhaust only when the valve is fully opened to said source.

6. A combined pressure controlling and holding valve for operating a fluid pressure brake or the like comprising in combination, a three-way valve of the balanced, sliding spool type having a pressure, a tank and a motor port and shiftable to selectively connect the motor port to the tank port or the pressure port or to neither and inherently non-positive in sealing said ports from one another, a spring for shifting said valve to connect the motor port with the pressure port, pressure responsive means in communication with the motor port for shifting the valve in the opposite direction, manually shiftable means to vary the force of the spring, additional valve means of the positive-sealing type operated concurrently with the three-way valve for sealing the motor port from the tank port when the three-way valve is wide open to the pressure port, and a check valve of the positive-sealing type connected with the pressure port whereby pressure once built up on the brake may be held indefinitely against leakage while pressure fluid from the source is no longer available.

RAYMOND C. GRIFFITH.
DUNCAN B. GARDINER.